US008601868B2

(12) United States Patent
Hastings et al.

(10) Patent No.: US 8,601,868 B2
(45) Date of Patent: Dec. 10, 2013

(54) GEARBOX WITH SIGHT WINDOW

(75) Inventors: Dawson W. Hastings, Selma, AL (US);
Brian A. Peters, Nashville, TN (US);
Jeffrey W. Tucker, Prattville, AL (US)

(73) Assignee: Alamo Group Inc., Seguin, TX (US)

( * ) Notice: Subject to any disclaimer, the term of this patent is extended or adjusted under 35 U.S.C. 154(b) by 491 days.

(21) Appl. No.: 12/908,118

(22) Filed: Oct. 20, 2010

(65) Prior Publication Data

US 2011/0094332 A1 Apr. 28, 2011

Related U.S. Application Data

(60) Provisional application No. 61/253,932, filed on Oct. 22, 2009.

(51) Int. Cl.
*G01F 23/02* (2006.01)
*G01F 15/04* (2006.01)

(52) U.S. Cl.
USPC .............................................. 73/323; 116/276

(58) Field of Classification Search
USPC .................................. 73/323; 116/276; 184/96
See application file for complete search history.

(56) References Cited

U.S. PATENT DOCUMENTS

| | | | |
|---|---|---|---|
| 3,407,662 A * | 10/1968 | Tarbox | 73/325 |
| 3,625,310 A | 12/1971 | Herrick | 184/6.12 |
| 4,182,179 A | 1/1980 | Meginnis | 73/334 |
| 5,383,360 A | 1/1995 | Bertani | 73/323 |
| 6,082,972 A | 7/2000 | Moore, Jr. et al. | 417/63 |
| 6,427,427 B1 | 8/2002 | Dietz | 56/1 |

OTHER PUBLICATIONS

Over-Sized Gearboxes; www.degelman.com printout circa Sep. 2009; Degelman Industries Ltd., Regina, SK, Canada.
Aerokopter 1-3 Sanka Helicopter circa Jun. 2006, Technical Details at www.aerokopter.co.za, and detail of photograph on p. 4 of 9 of tail rotor gearbox and descriptive text.
Elesa S.P.A. web brochure of GN743.3 oil level indicators, circa 2007 or earlier, at www. elesa.com, and photo of same installed in a Bush Hog utility vehicle.
Elesa S.P.A. web brochure of column level indicators, circa 2007 or earlier, at www.elesa.com, and photo of an Elesa column level indicator installed on a Bush Hog gearbox.

* cited by examiner

*Primary Examiner* — Peter Macchiarolo
*Assistant Examiner* — Tamiko Bellamy
(74) *Attorney, Agent, or Firm* — Cook Alex Ltd.

(57) ABSTRACT

A gearbox for an engine-driven mechanism comprises a gearbox housing having opposing walls. A first bearing bore is defined in one of the opposing walls and adapted for receiving an input shaft. A second bearing bore is defined in the other opposing wall and aligned with the first bearing bore. Each bearing bore mounts a bearing for supporting the input shaft which extends through the first bearing bore and into the gearbox. The second bearing bore includes an associated transparent and/or translucent lens to define a sight window for monitoring the level of oil in the gearbox. A sight window of this nature is particularly well suited for retrofitting older gearboxes which lack a sight window.

24 Claims, 11 Drawing Sheets

GEARBOX WITH SIGHT WINDOW

CROSS-REFERENCE TO RELATED APPLICATIONS

This application claims the benefit of U.S. Provisional Patent Application Ser. No. 61/253,932, filed on Oct. 22, 2009, which is hereby incorporated herein by reference.

BACKGROUND

1. Field of the Disclosure

The present subject matter generally relates to oil level sight windows for gearboxes.

2. Description of Related Art

Engine-driven mechanisms require a minimum amount of a lubricant to ensure proper operation of the moving parts of the drive system. In some engine-driven mechanisms, such as agricultural equipment, the drive system includes a gearbox containing various gears, shafts, and other moving parts, as well as an amount of oil for lubricating the moving parts.

Figure 1:
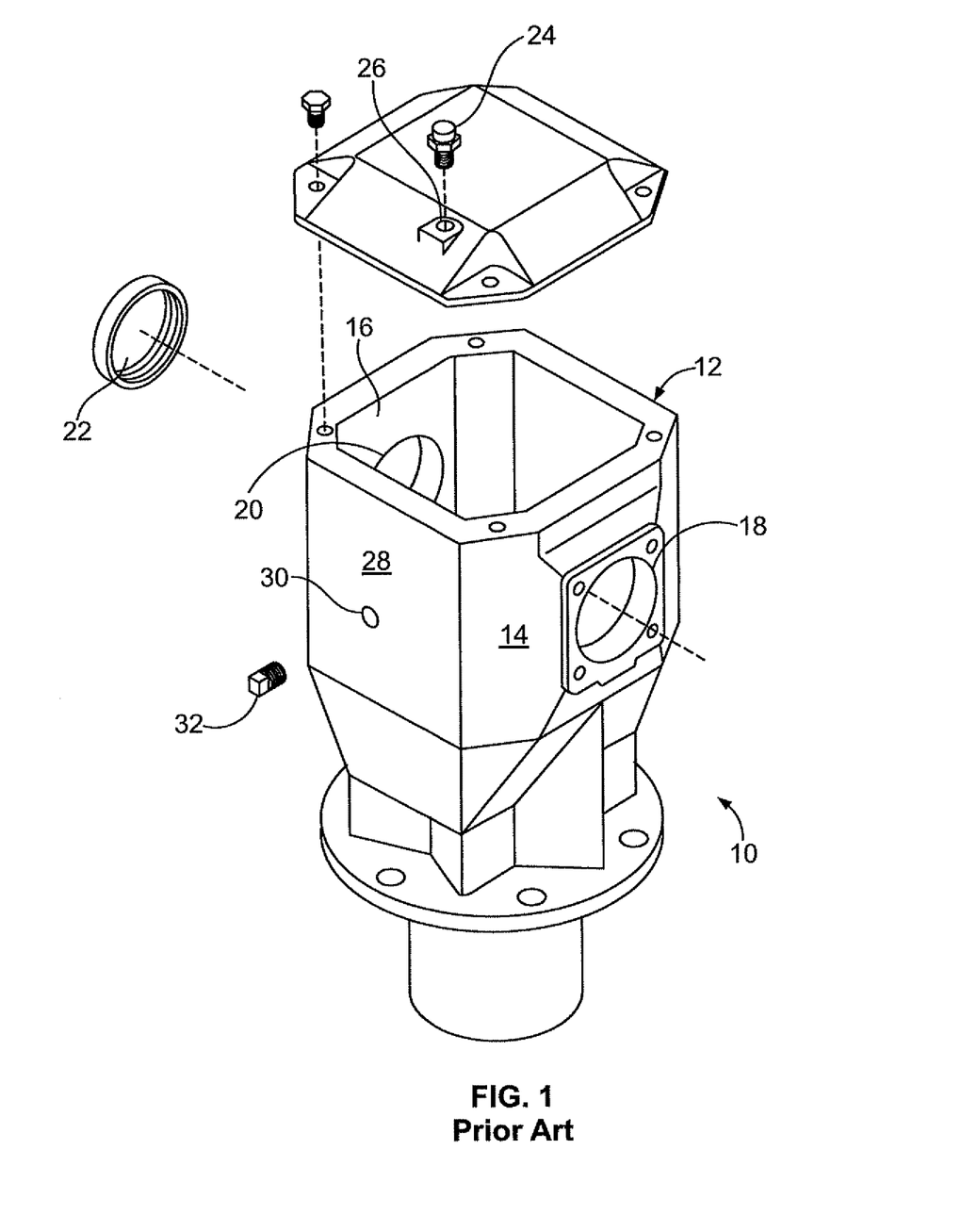
FIG. 1 is an exploded perspective view of a known prior art gearbox having an oil level plug for checking the gearbox oil level.

An exemplary prior art gearbox 10 is illustrated in FIG. 1. The gearbox 10 includes a gearbox housing 12 with opposing walls 14 and 16. A pair of bearing bores 18 and 20 are defined in the opposing walls 14 and 16, respectively. The bearing bores 18 and 20 are aligned with each other for mounting bearings (not illustrated) to support an input shaft (not illustrated) extending through the first bearing bore 18 and into the gearbox housing 12. A metallic bore cap plug 22 is associated with the second bearing bore 20 to isolate the interior of the gearbox housing 12 from the outside environment.

To fill the gearbox housing 12 with oil, a fill plug 24 on the top of the gearbox housing 12 is removed to expose a fill hole 26. Oil is poured into the gearbox housing 12 via the fill hole 26 and the fill plug 24 is replaced once the amount of oil in the gearbox housing 12 has reached the proper level. To ascertain the gearbox oil level, a side wall 28 of the gearbox housing 12 is provided with a small aperture 30 which receives a removable oil level plug 32. The level of oil in the gearbox housing 12 is checked by removing the oil level plug 32 and looking inside.

It has been recognized that removing an oil level plug to check the gearbox oil level can be disadvantageous, so in some gearboxes, the oil level plug is either replaced by or supplemented with a sight window. The sight window typically comprises the combination of an aperture in the gearbox housing and a lens received by or otherwise associated with the aperture. Rather than having to remove a plug to check the gearbox oil level, one merely looks through the sight window to verify the oil level.

One problem with a typical sight window is that it can be labor-intensive to retrofit onto a gearbox having only an oil level plug. For example, in some cases, a large aperture must be machined in a wall of the gearbox housing to receive a lens.

To simplify installation of a sight window in retrofitting situations, it is known to replace the standard (i.e., opaque) oil level plug with a plug having a built-in lens, such as the GN 743 line of oil level indicators from Elesa S.p.A. of Monza, Italy. Such oil level indicators avoid the problem of adding a large bore to the gearbox housing, but can be disadvantageous in that they are small, which can make it difficult to accurately assess the gearbox oil level.

Accordingly, there remains the need for a larger oil level sight window which can be easily retrofitted onto a gearbox having only an oil level plug.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a sight window is provided for a gearbox having a gearbox housing and a pair of bearing bores. The bearing bores are aligned with each other and defined in opposing walls of the gearbox housing. The sight window comprises one of the bearing bores and a generally transparent and/or translucent lens associated therewith.

In another aspect, a gearbox for an engine-driven mechanism comprises a gearbox housing having opposing walls. A first bearing bore is defined in one of the opposing walls and adapted for receiving a shaft. A sight window comprises a second bearing bore, which is defined in the other opposing wall and aligned with the first bearing bore, and a generally transparent and/or translucent lens associated with the second bearing bore.

In yet another aspect, a method of providing a gearbox of an engine-driven mechanism with a sight window comprises providing a gearbox and a generally transparent and/or translucent lens. The gearbox includes a gearbox housing having opposing walls, a first bearing bore defined in one of said opposing walls and adapted for receiving a shaft, and a second bearing bore defined in the other opposing wall and aligned with the first bearing bore. The lens is associated to the second bearing bore to provide a sight window as a feature.

DESCRIPTION OF THE ILLUSTRATED EMBODIMENTS

The embodiments disclosed herein are for the purpose of providing the required description of the present subject matter. They are only exemplary, and may be embodied in various forms. Therefore, specific details disclosed herein are not to be interpreted as limiting the subject matter as defined in the accompanying claims.

Figure 2:
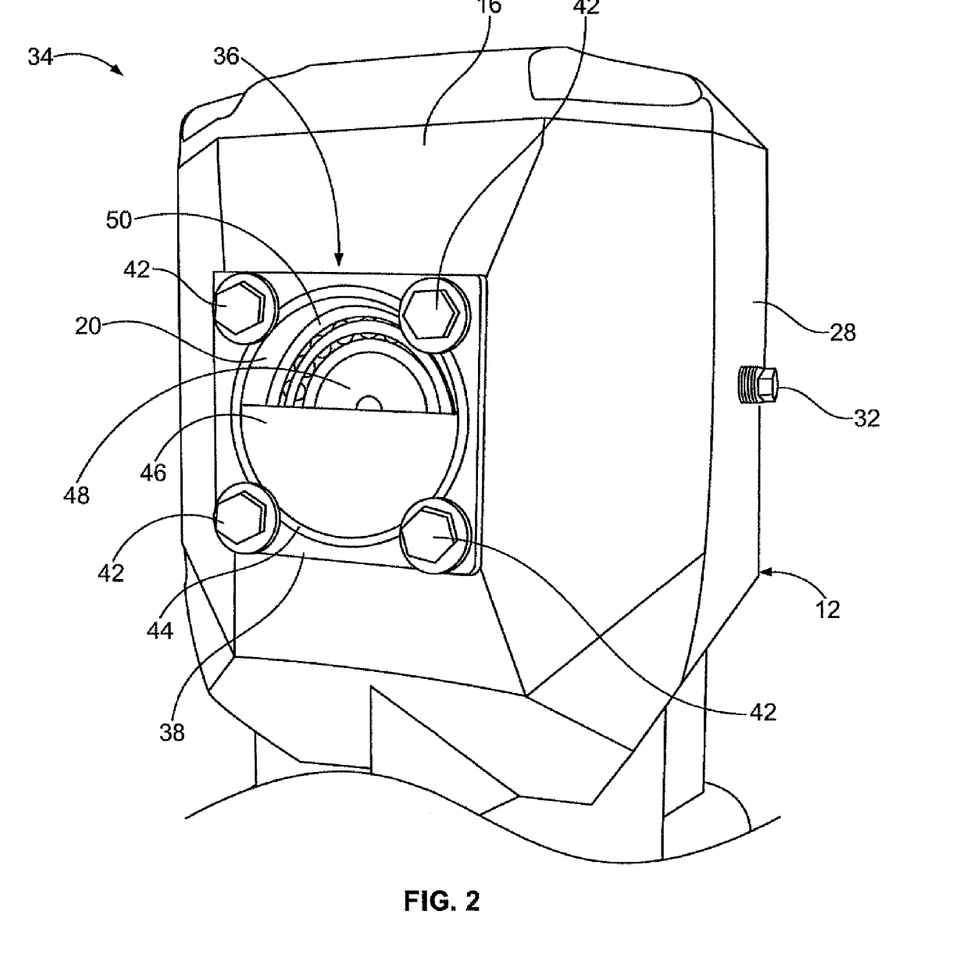
FIG. 2 is a front perspective view of a gearbox incorporating a sight window according to one aspect of the present disclosure.
Figure 2A:
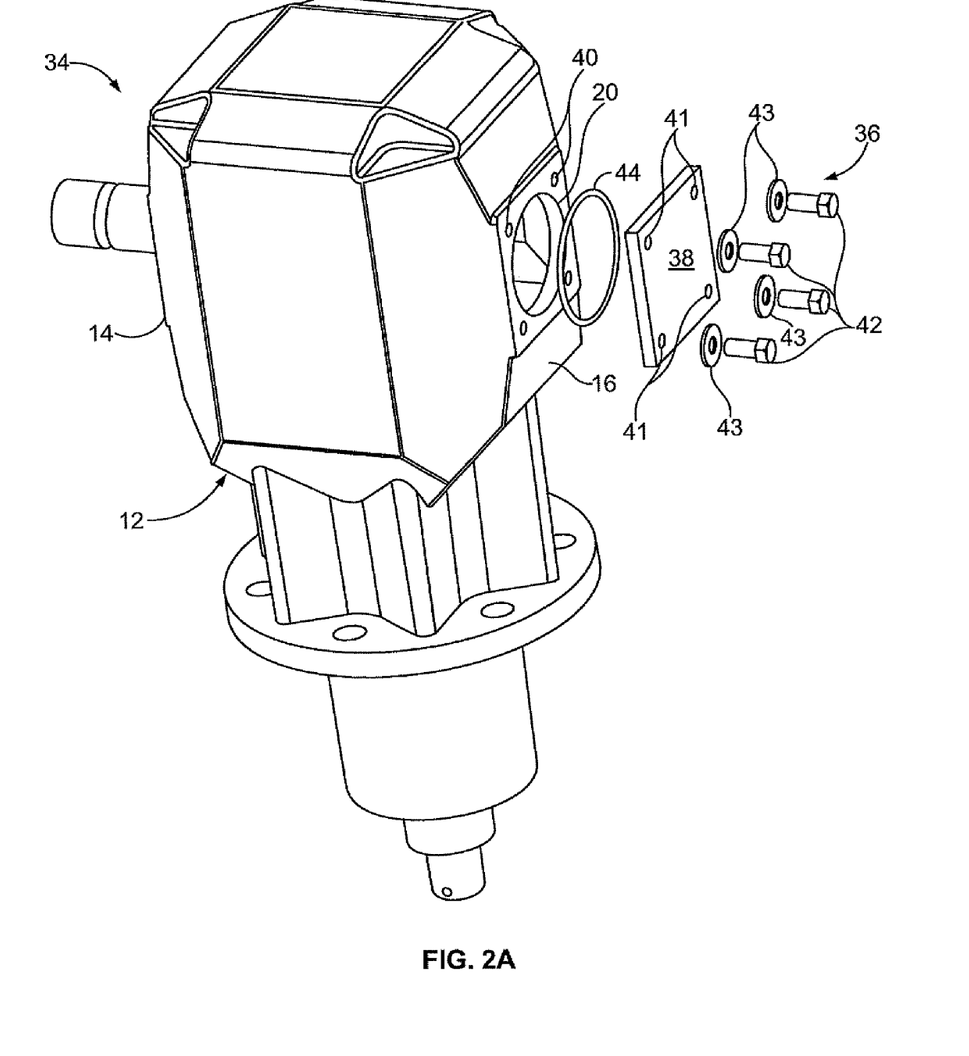
FIG. 2A is an exploded perspective view of the gearbox of FIG. 2.

FIGS. 2 and 2A show a gearbox 34 employing a sight window assembly 36 according to an aspect of the present disclosure. The gearbox 34 is identical to the gearbox 10 of FIG. 1, except that the bore cap plug 22 of FIG. 1 has been eliminated and replaced with the sight window 36. The sight window assembly 36 comprises the combination of the second bearing bore 20 and a generally transparent and/or translucent lens 38 associated therewith. As used herein, the term "lens" broadly refers to a generally transparent and/or translucent piece of material (typically glass, plastic, safety glass, or polycarbonate) and is not limited to a particular shape or configuration.

As shown in FIG. 2A, the wall 16 includes four threaded holes 40 spaced around the second bearing bore 20. The lens 38 includes four holes 41 adapted to align with the four threaded holes 40 when the lens 38 is placed against the wall 16. Each hole 41 of the lens 38 receives a threaded fastener 42 which is mated with the corresponding threaded hole 40 of the wall 16 for securing the lens 38 to the wall 16. Such a means for securing the lens 38 to the wall 16 is advantageous when the wall 16 is provided with threaded holes 40, although other means for securing the lens 38 to the wall 16 may be employed without departing from the scope of the present disclosure. Each threaded fastener 42 may be used in combination with an associated washer 43 to protect the lens 38 when the threaded fasteners 42 are tightened.

The side of the lens 38 facing the wall 16 includes a groove, channel, or inset for accommodating a sealing member 44, illustrated in FIGS. 2 and 2A as an annular o-ring. The sealing member 44 is positioned between the lens 38 and the wall 16, such that it is tightly sandwiched between the lens 38 and the wall 16 when the lens 38 is secured to the wall 16. The sealing member 44 surrounds the second bearing bore 20 and prevents leakage of oil 46 from the second bearing bore 20.

The illustrated lens 38 is generally square or rectangular, but can be any shape, provided that it is sufficiently sized to overlay the second bearing bore 20. As the bore cap plug 22 of FIG. 1 is effectively replaced by the sight window 36, the lens 38 itself provides the function of the bore cap plug, which is to isolate the interior of the gearbox housing 12 from the outside environment.

Once the lens 38 has been associated to the second bearing bore 20, the resulting sight window assembly 36 may be used to monitor the interior of the gearbox housing 12. As with known sight windows, sight windows according to the present disclosure may be used to monitor the level of oil 46 in the gearbox housing 12, but positioning the sight window assembly 36 at the second bearing bore 20 is additionally advantageous because one can monitor the input shaft 48 and one of the bearings 50 from an end view (FIG. 2). Such a perspective is useful for detecting and assessing a number of possible problems occurring in the gearbox without dismantling the gearbox.

Figure 3:
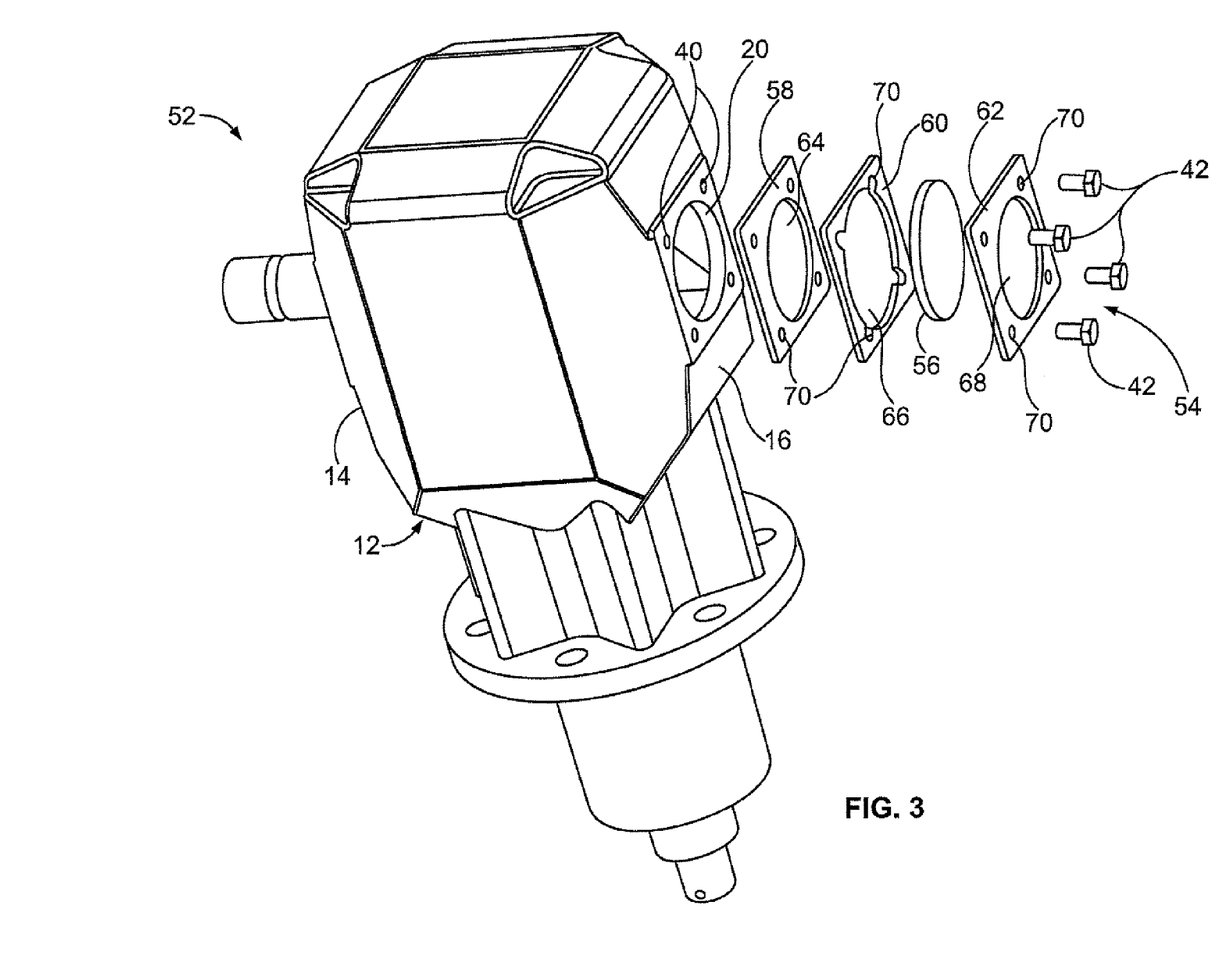
FIG. 3 is an exploded perspective view of a gearbox incorporating an alternative sight window according to one aspect of the present disclosure.

FIG. 3 illustrates a gearbox 52 which has the same gearbox housing 12 of FIGS. 2 and 2A, but employs a different sight window assembly 54 according to the present disclosure. In particular, the sight window assembly 54 of FIG. 3 includes a lens 56 which is associated to the second bearing bore 20 by an assembly including a sealing member 58, a locating member 60, a cover member 62, and fasteners 42. In contrast to the lens 38 of FIGS. 2 and 2A, the lens 56 of FIG. 3 is substantially circular instead of being rectangular. Additionally, the lens 56 of FIG. 3 omits holes for receiving the fasteners 42, so it is not itself directly fastened to the wall 16 and the other elements of the sight window 54 provide means for positioning the lens 56 with respect to the second bearing bore 20 and securing it to the wall 16.

In the illustrated embodiment, the sealing member 58 is an elastomeric gasket with a generally square or rectangular outer perimeter and a circular central opening 64 which is most advantageously at least as large as the second bearing bore 20. Similar to the sealing member 44 of FIGS. 2 and 2A, the sealing member 58 of FIG. 3 is adapted to be positioned between the lens 56 and the wall 16 and tightly sandwiched therebetween when the lens 56 is secured to the wall 16. Various gasket materials can be utilized, such as a natural rubber, a synthetic rubber, a resilient polymer, and so forth, preferably exhibiting elastomeric properties so as to provide a tight, leak-resistant and secure seal along the gasket. To facilitate the tight sandwiching aspect of the sealing member, it is most advantageous for the central opening 64 of the sealing member 58 to be smaller than the lens 56 so that, when the lens 56 is associated to the second bearing bore 20, the perimeter of the lens 56 will press the sealing member 58 against the wall 16 to encircle the second bearing bore 20.

As for the illustrated locating member 60, it is provided as a relatively rigid bezel with a generally square or rectangular outer perimeter and a circular central opening 66. The outer perimeter of the illustrated locating member 60 is substantially identical to the outer perimeter of the sealing member 58, while the central opening 66 is substantially the same size as the lens 56. The lens 56 is received within the central opening 66 of the locating member 60 to properly position the lens 56 with respect to the second bearing bore 20.

The cover member 62 of FIG. 3 is relatively rigid, with a generally square or rectangular outer perimeter and a circular central opening 68. The outer perimeter of the illustrated cover member 62 is substantially identical to the outer perimeters of the sealing member 58 and the locating member 60, while the central opening 68 is smaller than the central opening 66 of the locating member 60 to prevent the lens 56 from falling away from the gearbox housing 12. Most advantageously, the central opening 68 of the cover member 62 is at least the same size as the second bearing bore 20 to maximize visibility into the gearbox housing 12.

To assemble the components of the sight window assembly 54, the lens 56 is seated within the central opening 66 of the locating member 60, with the sealing member 58 being positioned between the locating member 60 and the wall 16 and the cover member 62 being positioned outwardly of the locating member 60. Each of the illustrated sealing member 58, locating member 60, and cover member 62 is provided with four holes 70 that are each aligned with the corresponding holes 70 of the other members. Each hole 70 receives a threaded fastener 42 which is mated with the corresponding threaded hole 40 of the wall 16 for associating the lens 56 to the second bearing bore 20.

Figure 4:
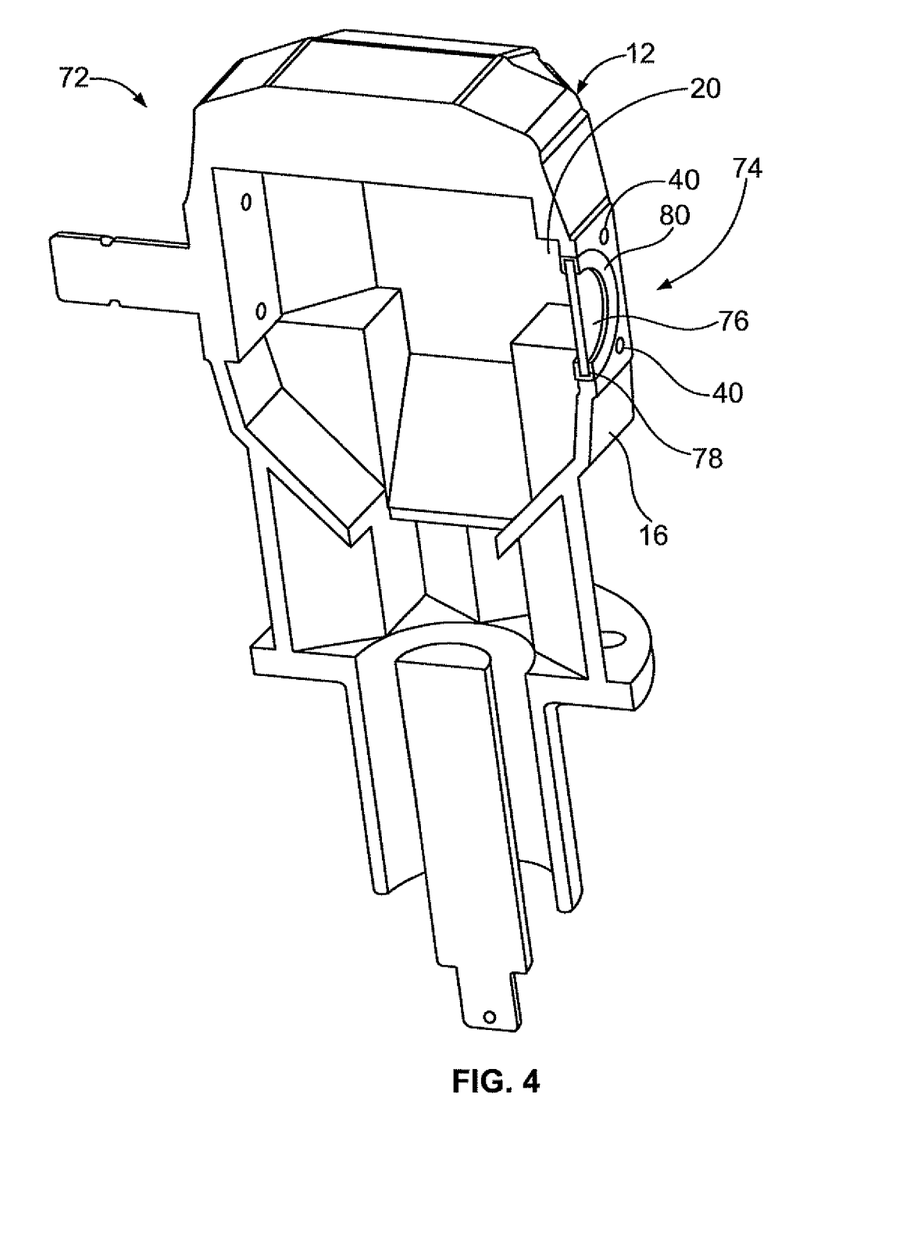
FIG. 4 is a cross-sectional view of a gearbox incorporating yet another alternative sight window according to one aspect of the present disclosure.
Figure 4A:
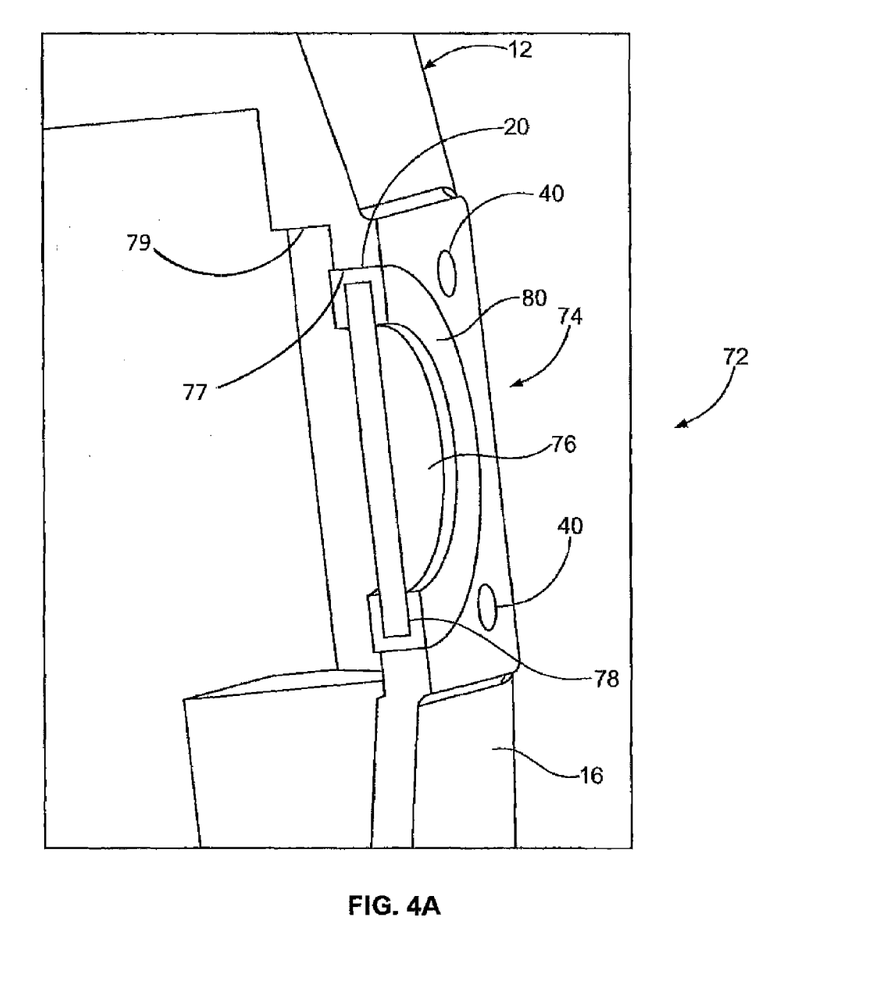
FIG. 4A is a detail cross-sectional view of the sight window of the gearbox of FIG. 4.

FIGS. 4 and 4A show yet another gearbox 72 which has the same gearbox housing 12 of FIGS. 1-3, but employs a different sight window assembly 74 according to the present disclosure. Rather than securing a lens to the exterior of the wall 16 either directly (as in FIG. 2) or indirectly (as in FIG. 3), the sight window assembly 74 of FIG. 4 has a lens 76 which is seated within the second bearing bore 20. In particular, the sight window assembly 74 of FIG. 4 includes a circular lens 76 with a perimeter which is received within an annular channel or groove 78 defined along the inner perimeter of an annular sealing or grommet member 80. The sealing member 80 is at least partially formed of an elastomeric material (for example, rubber, synthetic rubber or a resilient polymer having elastomeric properties) and is configured to fit tightly within the second bearing bore 20 which, in this illustrated embodiment, has two circumferential portions 77 and 79. Portion 77 is an outer circumferential portion sized to both receive and maintain the lens 76 in position and to also provide a seal between the second bearing bore 20 and the lens 76. Portion 79 is an inner circumferential portion sized to receive, for example, shaft 48 and bearings 50 (FIG. 2). It will be seen that the outer circumferential portion 77 has a diameter less than that of the inner circumferential portion 79. The sight window assembly 74 of FIG. 4 may be more advantageous than the embodiments of FIGS. 2 and 3 when the wall of the gearbox housing adjacent the second bearing bore omits threaded holes or is otherwise unsuitable for easily securing a lens thereto.

Figure 5:
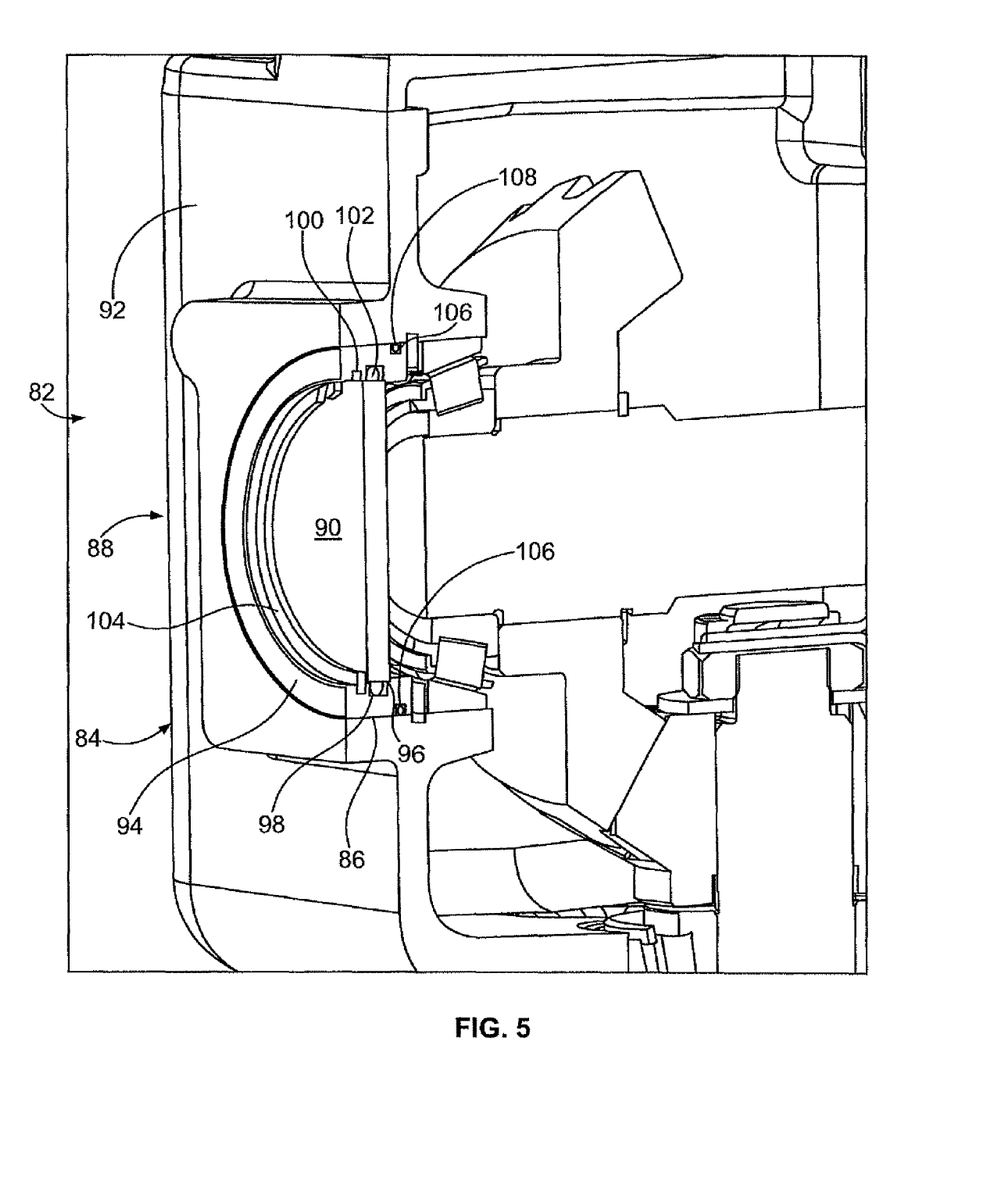
FIG. 5 is a cross-sectional view of a gearbox incorporating another alternative sight window according to one aspect of the present disclosure.

Although the sight window assembly of each of FIG. 2, FIG. 3 and FIG. 4 is shown in combination with the same gearbox housing, the principles described herein are not limited to the illustrated gearbox housing and may be employed with other gearbox housing configurations without departing from the scope of the present disclosure. For example, FIG. 5 shows a gearbox 82 with a gearbox housing 84 which is similar to the gearbox 12 of FIGS. 1-4A, but omits threaded holes surrounding the second bearing bore 86. The gearbox 82 of FIG. 5 includes a sight window assembly 88 which is similar to the sight window assembly 74 of FIGS. 4 and 4A in that it has a lens 90 which is seated within the second bearing bore 86 rather than being secured to the associated wall 92.

Figure 6:
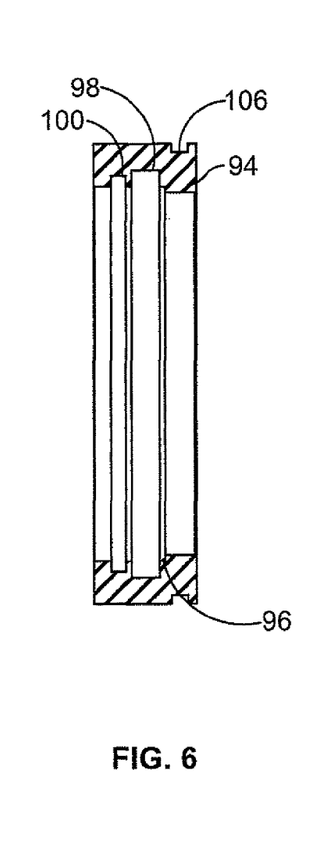
FIG. 6 is a cross-sectional view of a ring member of the sight window of FIG. 5.
Figure 7:
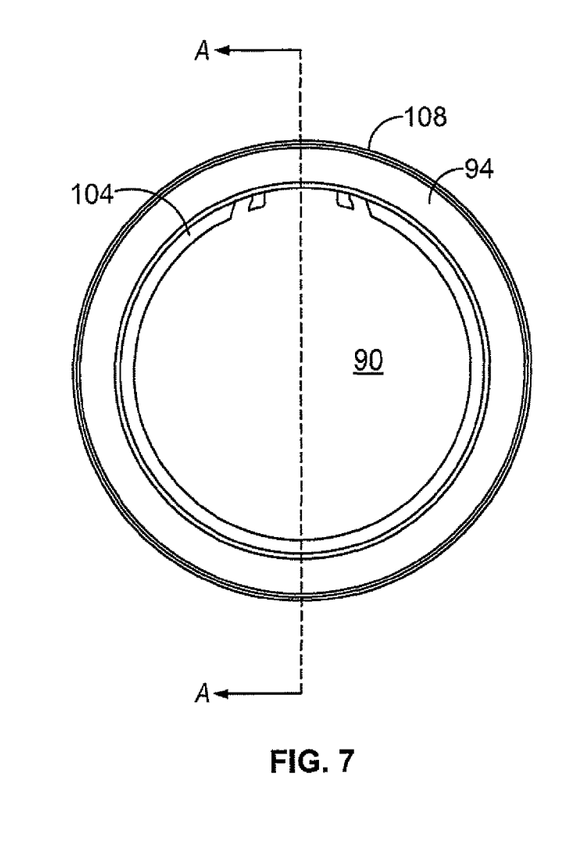
FIG. 7 is a front elevational view of the ring member of FIG. 6, including a lens and other components of the sight window of FIG. 5.
Figure 7A:
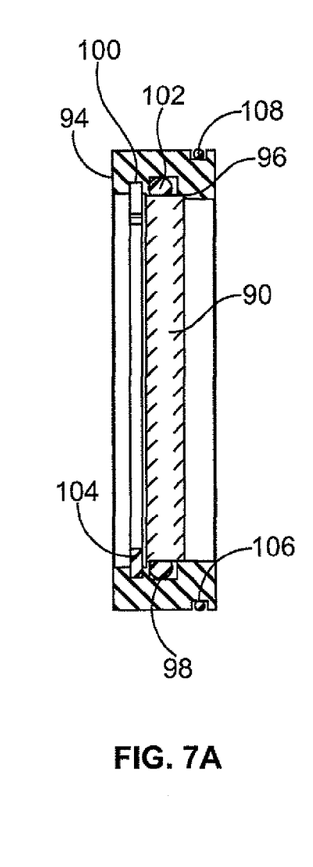
FIG. 7A is a cross-sectional view of the ring member and associated components of FIG. 7, taken through the line A-A of FIG. 7.

More particularly, the sight window assembly 88 of FIG. 5 includes an annular ring member 94, which is shown in greater detail in FIGS. 6-7A. The ring member 94 is relatively rigid, being formed of a metallic material in one embodiment, and has an inner surface which is adapted to seat the lens 90. To that end, the inner surface of the illustrated ring member 94 is provided with a small annular shoulder 96 having a diameter suitably sized to orient the lens 90 and prevent it from falling into the interior of the gearbox housing 84.

The inner perimeter of the ring member 94 further includes a pair of inner channels or grooves 98 and 100. The first inner groove 98 is positioned closer to the interior of the gearbox housing 84 than the second inner groove 100 when the ring member 94 is received by the second bearing bore 86, as shown in FIG. 5.

The first inner groove 98 is adapted to receive an inner sealing member 102, which is illustrated as an annular o-ring. The shoulder 96 of the ring member 94 is adjacent to the first inner groove 98 and positions the lens 90 in line with the first inner groove 98. With the inner sealing member 102 in place within the first inner groove 98, the lens 90 is pressed into the ring member 94 until it abuts the shoulder 96. So pressing the lens 90 into the ring member 94 presses the inner sealing member 102 against the first inner groove 98, thereby providing a seal between the ring member 94 and lens 90.

When the lens 90 has been pressed into the ring member 94, a retaining member 104 is inserted into the second inner groove 100. In the illustrated embodiment, the retaining member 104 is a typical snap ring with a diameter that can be temporarily decreased (e.g., using pliers) to position it within the second inner groove 100 and then returned to its original diameter to seat within the second inner groove 100. As best shown in FIGS. 5 and 7A, the diameter of the lens 90 is larger than at least the inner diameter of the retaining member 104, so the retaining member 104 effectively prevents the lens 90 from falling away from the gearbox housing 84. Hence, the lens 90 is trapped in place within the ring member 94 on opposite sides by the shoulder 96 and the retaining member 104 and on its outer perimeter by the inner sealing member 102.

With the lens 90 secured in place within the ring member 94, the ring member 94 may be inserted within the second bearing bore 86 of the gearbox housing 84 to form the sight window assembly 88. The ring member 94 is configured to fit snugly within the second bearing bore 86 (FIG. 5), but there may be slight dimensional differences therebetween, creating a small gap. To avoid oil leakage, the outer surface of the ring member 94 may be provided with an outer channel or groove 106 for receiving an outer sealing member 108, illustrated as an annular o-ring. The outer sealing member 108 is positioned between the ring member 94 and the second bearing bore 86 to eliminate any gap therebetween.

Figure 8:
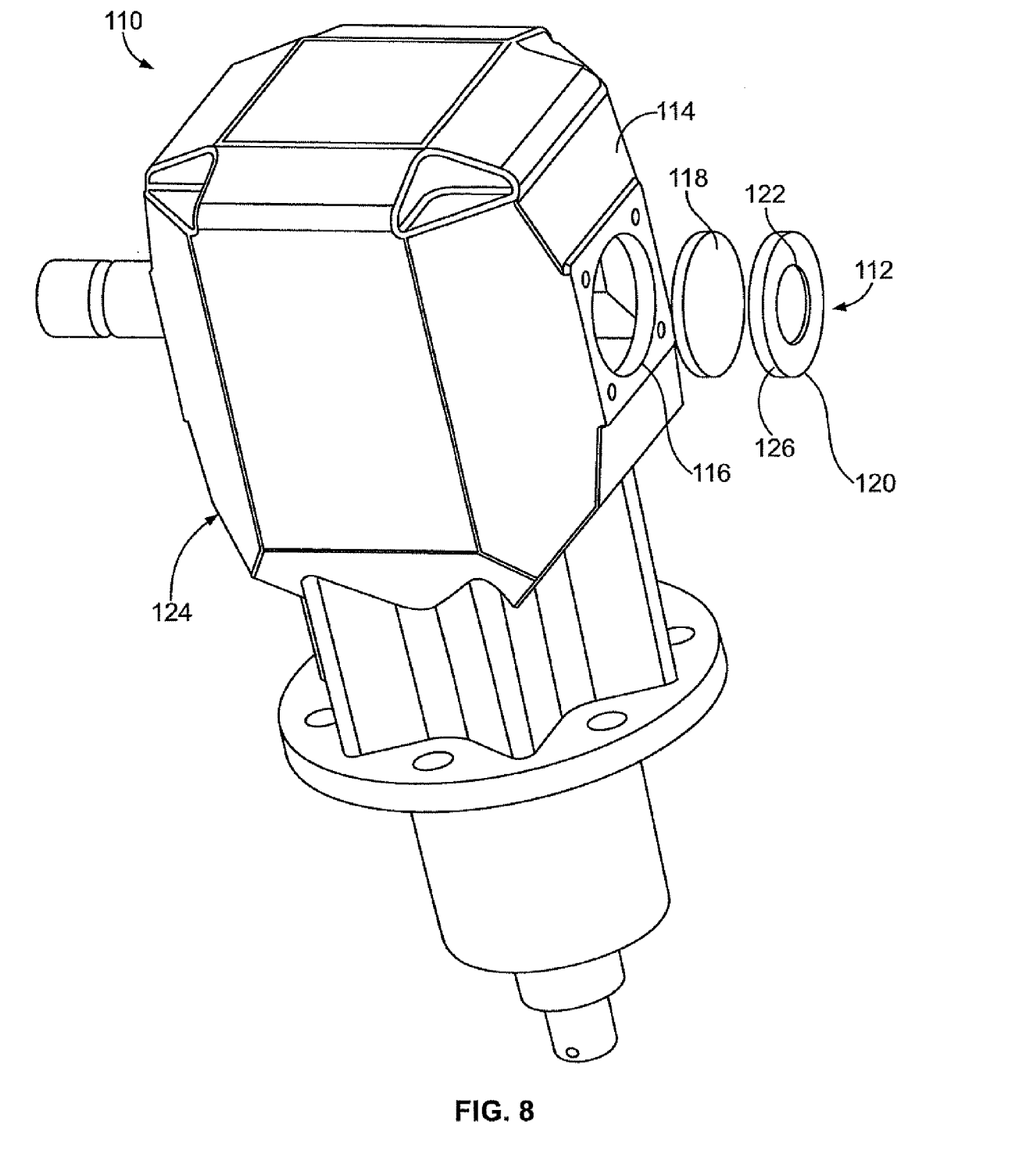
FIG. 8 is an exploded perspective view of a gearbox incorporating yet another alternative sight window according to one aspect of the present disclosure.

FIG. 8 illustrates another gearbox 110 incorporating a sight window 112 which may be advantageous for use in combination with a gearbox housing lacking threaded holes or other means for affixing a lens to the wall 114 associated with the second bearing bore 116. In the embodiment of FIG. 8, the sight window 112 includes a lens 118 and a modified bore cap plug 120. The modified bore cap plug 120 of FIG. 8 is similar to the bore cap plug 22 of FIG. 1, but includes an opening 122 machined or otherwise formed in its center. The central opening 122 is illustrated in FIG. 8 as being circular, but may be any shape without departing from the scope of the present disclosure. Most advantageously, the central opening 122 is relatively large to increase visibility through the sight window 112 and into the interior of the gearbox housing 124.

As per the design which is conventional of known bore cap plugs, the modified bore cap plug 120 includes a skirt or rim 126 extending in one direction from its outer perimeter. The lens 118 is adapted to be received within the skirt 126 to ensure that the lens 118 does not interfere with the association of the second bearing bore 116 and the modified bore cap plug 120 (via the skirt 126, per conventional design). In addition to being adapted to seat within the skirt 126, it is also advantageous for the lens 118 to be sized and configured to completely overlay the central opening 122 to prevent leakage of oil when the combination of the modified bore cap plug 120 and the lens 118 are associated to the second bearing bore 116. In the illustrated embodiment, the lens 118 is substantially circular, with a diameter greater than the diameter of the circular central opening 122 and less than the diameter of the skirt 126. In other embodiments, the central opening 122 and the lens 118 may be provided in non-circular shapes without departing from the scope of the present disclosure, provided that the lens 118 overlays the central opening 122 when seated within the skirt 126.

The lens 118 is affixed to the modified bore cap plug 120 to prevent it from becoming dislodged during use of the gearbox 110. The lens 118 may be affixed by any one of a variety of means such as, but not limited to, an adhesive that will not degrade upon prolonged exposure to oil or whatever other lubricant is used in the gearbox 110. When the lens 118 has been affixed to the modified bore cap plug 120, the combination is secured within the second bearing bore 116 in the same way as a conventional bore cap plug (such as the bore cap plug 22 of FIG. 1) to provide a sight window 112.

Figure 9:
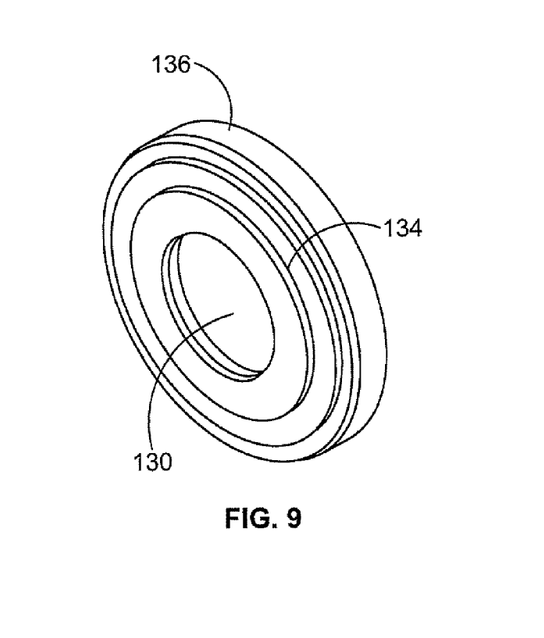
FIG. 9 is a perspective view of selected components of another embodiment of a sight window according to an aspect of the present disclosure.
Figure 10:
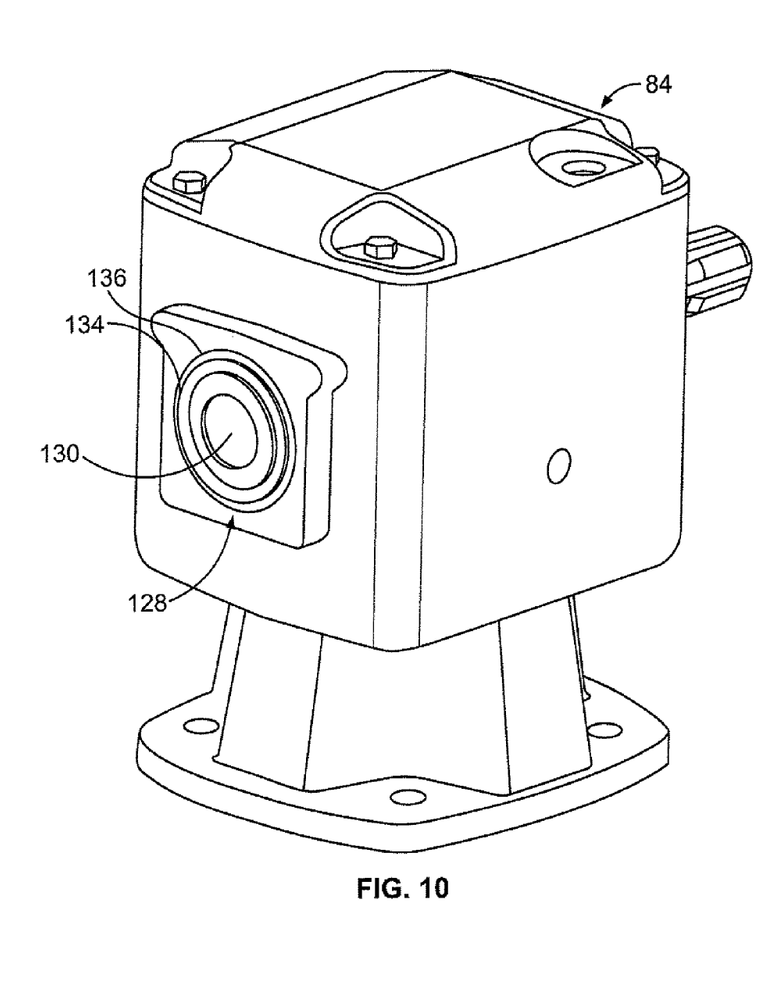
FIG. 10 is a perspective view of a gearbox incorporating the sight window of FIG. 9.
Figure 11:
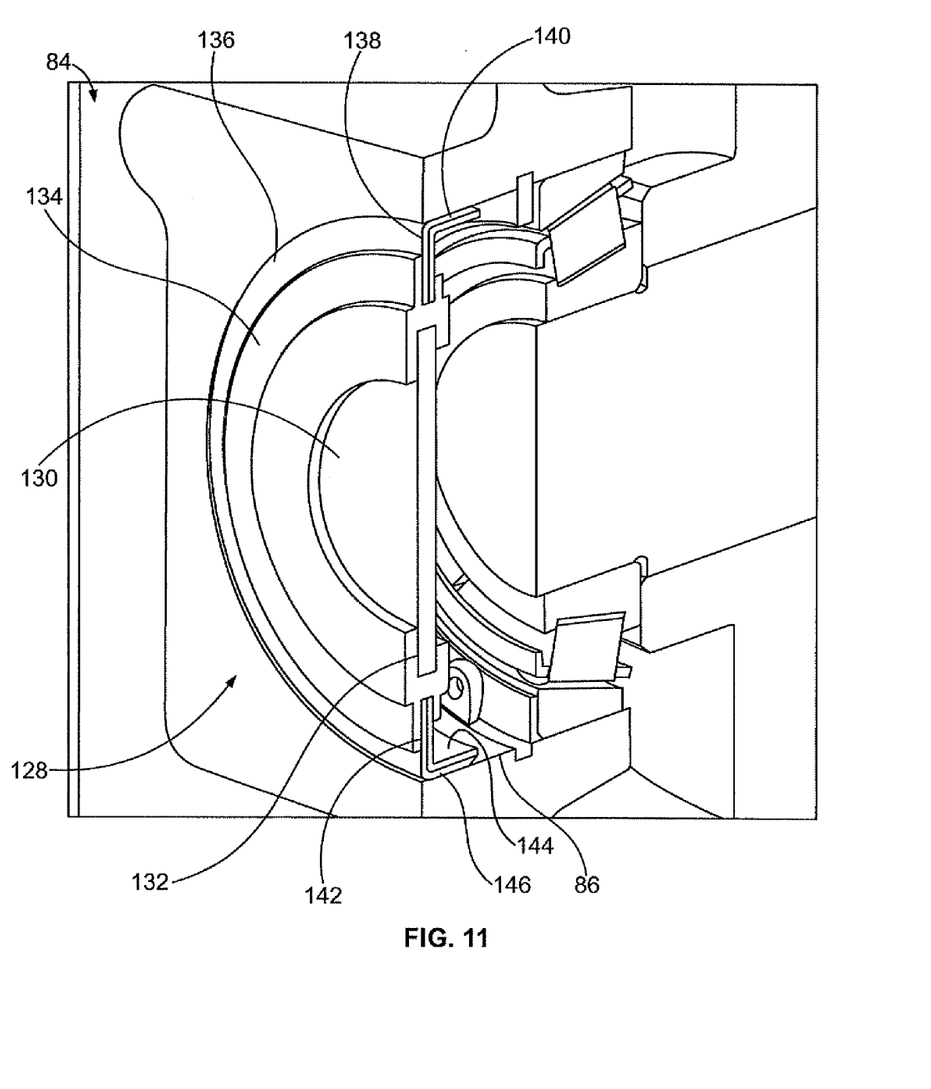
FIG. 11 is a cross-sectional view of the gearbox of FIG. 10.

FIGS. 9-11 show another alternative sight window assembly 128, which can be incorporated into the gearbox housing 84 of FIG. 5, as shown in FIGS. 10 and 11. Similar to the embodiment of FIGS. 4 and 4A, the sight window assembly 128 has a lens 130 which is seated within the second bearing bore 86. In particular, the sight window assembly 128 of FIG. 9 includes a circular lens 130 with a perimeter which is received snugly within an annular channel or groove 132 defined along the inner perimeter of an annular grommet member 134.

The grommet member 134 of FIGS. 9-11 is comparable to the sealing member 80 of FIG. 4 (e.g., being at least partially formed of an elastomeric material, such as rubber, synthetic rubber, or a resilient polymer having elastomeric properties). The grommet member 134 may be embossed or otherwise molded or designed to include various markings and information such as, for example, a company name, a part number, etc. In contrast to the sealing member 80 of FIG. 4, the grommet member 134 of FIG. 9 has an outer diameter less than that of the second bearing bore 86. Accordingly, the grommet member 134 forms a seal around the lens 130, but does not form a secondary seal against the second bearing bore 86. Instead, the sight window assembly 128 is provided with a generally annular sealing ring 136 which serves to provide a seal between the grommet member 134 and the second bearing bore 86, as shown in FIGS. 10 and 11.

As best illustrated in FIG. 11, the sealing ring 136 has a generally L-shaped cross-section, with a first leg or surface 138 and a second leg or surface 140 which are generally or substantially perpendicular to each other. At least an outer end of the first surface 138 is received within an annular channel or groove 142 defined in the outer perimeter of the grommet member 134. The first surface 138 extends in a generally or substantially radial direction to span the gap between the outer perimeter of the grommet member 134 and the second bearing bore 86. The second surface 140 has a curvature matching that of the second bearing bore 86 and forms a friction fit therein when the sealing ring 136 is pressed into the second bearing bore 86.

The sealing ring 136 is a composite component, being comprised of a relatively rigid base 144 (formed of a metallic material in a preferred embodiment) and a softer coating layer 146 (formed of an elastomeric or rubber material in a preferred embodiment). The base 144 and coating layer 146 may be joined by any suitable means, including known means for applying an elastomeric coating to a metallic piece of material.

In the illustrated embodiment, the coating layer 146 covers substantially the entire outer side of the base 144 (i.e, the portion of the first surface 138 which faces away from the gearbox housing and the portion of the second surface 140 which abuts the second bearing bore 86 when the sealing ring 136 is installed within the second bearing bore 86). However, in other embodiments, the coating layer 146 may cover only a portion of the outer side of the base 146 and/or some or all of the inner side of the base 144 (i.e., the portion of the first surface 138 which faces toward the interior of the gearbox housing and the portion of the second surface 140 which faces the central axis of the second bearing bore 86 when the sealing ring 136 is installed within the second bearing bore 86). By such a composite configuration, the sealing ring 136 is sufficiently rigid to hold the grommet member 134 in place within the second bearing bore 86 (in the orientation of FIGS. 10 and 11), while being sufficiently soft at the location(s) of the coating layer 146 to provide a fluid-tight sealing surface.

Although the sight window assembly of FIGS. 9-11 is shown in combination with the gearbox housing of FIG. 5, it should be understood that it may be used in combination with other gearbox housings (including the gearbox housing 12 of FIG. 1) without departing from the scope of the present disclosure.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims.

The invention claimed is:

1. A sight window assembly for a gearbox having a gearbox housing and a pair of bearing bores each rotatably receiving a shaft and aligned with each other and defined in opposing walls of the gearbox housing, the sight window assembly comprising one of the bearing bores and a generally transparent and/or translucent lens associated therewith, wherein said one of the bearing bores is of a first perimeter size, further comprising an annular grommet member supporting the lens and a sealing ring supporting the grommet member, wherein the sealing ring is configured to be at least partially received within said one of the bearing bores, wherein the grommet member is of a second perimeter size that is less than the first perimeter size thereby defining a gap between the grommet member and said one of the bearing bores, and wherein the sealing ring spans said gap.

2. The sight window assembly according to claim 1, wherein the grommet member is between the peripheral edge of the lens and the peripheral edge of said one of the bearing bores.

3. A gearbox for an engine-driven mechanism, comprising:
a gearbox housing having opposing walls;
a first bearing bore defined in one of said opposing walls and adapted for receiving a shaft; and
a sight window assembly comprising:
a second bearing bore defined in the other opposing wall and aligned with the first bearing bore,
the second bearing bore having a shaft rotatably received therein, and
a generally transparent and/or translucent lens associated with the second bearing bore,
the sight window assembly further includes an annular grommet member between the peripheral edge of the lens and the peripheral edge of the second bearing bore, the grommet member supporting the lens,
the sight window assembly further includes a sealing ring supporting the grommet member, and
the sealing ring is configured to be at least partially received within said second bearing bore and between the peripheral edge of the lens and the peripheral edge of the second bearing bore.

4. The gearbox according to claim 3, wherein the grommet member is between the peripheral edge of the lens and the peripheral edge of said second bearing bore.

5. The gearbox according to claim 3, wherein the lens is at least partially positioned within the second bearing bore.

6. The gearbox according to claim 3, wherein the lens is positioned exteriorly of the second bearing bore.

7. A method of providing a gearbox of an engine-driven mechanism with a sight window, comprising:
providing a gearbox including:
a gearbox housing having opposing walls,
a first bearing bore defined in one of said opposing walls and adapted for receiving a shaft, and a second bearing bore defined in the other opposing wall and aligned with the first bearing bore, the second bearing bore having a shaft rotatably received therein;
providing a sight window assembly including:
providing a generally transparent and/or translucent lens,
positioning an annular grommet member over the peripheral edge of the lens to support the lens,
supporting the grommet member with a sealing ring, thereby providing the sight window assembly; and
associating the sight window assembly having the lens to the second bearing bore, thereby providing the gearbox with a sight window.

8. The method according to claim 7, wherein said associating the lens to the second bearing bore includes positioning the lens at least partially within the second bearing bore.

9. The method according to claim 7, wherein said associating the lens to the second bearing bore includes positioning the lens entirely within the second bearing bore.

10. The method according to claim 7, wherein said associating the lens to the second bearing bore includes positioning the lens exteriorly of the second bearing bore.

11. The sight window assembly of claim 1, wherein said one of the bearing bores has an inner circumferential portion sized to receive a shaft and an outer circumferential portion sized to snugly receive the sealing ring.

12. The sight window assembly of claim 11, wherein said outer circumferential portion and said inner circumferential portion are of substantially the same diameter.

13. A sight window assembly for a gearbox having a gearbox housing and a pair of bearing bores aligned with each other and defined in opposing walls of the gearbox housing, the sight window assembly comprising one of the bearing bores and a generally transparent and/or translucent lens associated therewith, wherein said one of the bearing bores has an inner circumferential portion sized to receive a shaft and an outer circumferential portion sized to receive a grommet member snugly receiving the lens, and wherein said outer circumferential portion has a diameter less than that of the inner circumferential portion.

14. The gearbox of claim 3, wherein said second bearing bore has an inner circumferential portion sized to receive the shaft and an outer circumferential portion sized to snugly receive the sealing ring.

15. The gearbox of claim 14, wherein said outer circumferential portion and said inner circumferential portion are of substantially the same diameter.

16. A gearbox for an engine-driven mechanism, comprising:
a gearbox housing having opposing walls;
a first bearing bore defined in one of said opposing walls and adapted for receiving a shaft;
a sight window assembly comprising:
a second bearing bore defined in the other opposing wall and aligned with the first bearing bore, and
a generally transparent and/or translucent lens associated with the second bearing bore, wherein said second bearing bore has an inner circumferential portion sized to receive the shaft and an outer circumferential portion sized to receive a grommet member snugly receiving the lens, and wherein said outer circumferential portion has a diameter less than that of the inner circumferential portion.

17. The sight window assembly according to claim 1, wherein said sealing ring provides a friction-fit seal between the grommet member and said one of the bearing bores.

18. The method according to claim 7, further including pressing the sealing ring into the second bearing bore thereby providing a friction-fit seal of the sight window.

19. A gearbox for an engine-driven mechanism, comprising:
a gearbox housing having opposing walls;
a first bearing bore defined in one of said opposing walls and adapted for receiving a shaft;
a second bearing bore defined in the other opposing wall and aligned with the first bearing bore, the second bearing bore being associated with an outer circumferential portion and having an inner circumferential portion being of a first perimeter size and having a shaft rotatably received in said inner circumferential portion;
a sight window assembly associated with the second bearing bore, comprising:
a generally transparent and/or translucent lens having a perimeter,
an annular grommet member having an inner perimeter annular channel supporting the lens, the grommet member having an outer perimeter annular channel being of a second perimeter size that is less than the first perimeter size and greater than the lens perimeter, and
a sealing ring engaging the outer perimeter channel of the grommet member thereby supporting the grommet member, the sealing ring is configured to be at least partially received within said outer circumferential portion; and
whereby the sight window assembly is a sight window for the gearbox at the second bearing bore.

20. The gearbox according to claim 19, wherein the outer circumferential portion has a perimeter size less than the first perimeter size of the second bearing bore.

21. The gearbox according to claim 19, wherein the lens is at least partially positioned within the second bearing bore.

22. The gearbox according to claim 19, wherein the lens is positioned exteriorly of the second bearing bore.

23. A sight window assembly for a gearbox having a gearbox housing and a pair of bearing bores each rotatably receiving a shaft and aligned with each other and defined in opposing walls of the gearbox housing, an inner circumferential portion at one of said bearing bores, an outer circumferential portion at said one of said bearing bores, a sight window assembly comprising a generally transparent and/or translucent lens, an annular grommet member supporting the lens, and a sealing ring supporting the grommet member, wherein the grommet member is of a perimeter size that is less than the perimeter size of the inner circumferential portion.

24. The sight window assembly according to claim 23, wherein the grommet member perimeter size also is less than the perimeter size of the outer circumferential portion.

* * * * *